(12) United States Patent
Ishihara

(10) Patent No.: US 7,226,014 B2
(45) Date of Patent: Jun. 5, 2007

(54) RECORDING TAPE CARTRIDGE

(75) Inventor: Yusuke Ishihara, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 0 days.

(21) Appl. No.: 10/650,787

(22) Filed: Aug. 29, 2003

(65) Prior Publication Data

US 2004/0089757 A1    May 13, 2004

(30) Foreign Application Priority Data

Aug. 30, 2002    (JP)    ............................. 2002-255103

(51) Int. Cl.
*G11B 23/107* (2006.01)
(52) U.S. Cl. .................... 242/348.2; 360/132
(58) Field of Classification Search ................ 242/348, 242/348.2; 360/132
See application file for complete search history.

(56) References Cited

U.S. PATENT DOCUMENTS

| | | | |
|---|---|---|---|
| 4,775,115 A | 10/1988 | Gelardi | |
| 6,505,789 B2 * | 1/2003 | Ridl et al. | 242/348.2 |
| 6,650,504 B2 * | 11/2003 | Ridl | 360/132 |
| 6,695,242 B1 * | 2/2004 | Aaron et al. | 242/348.2 |
| 6,764,037 B2 * | 7/2004 | Hancock et al. | 242/348 |
| 6,840,472 B2 * | 1/2005 | Ishihara et al. | 242/332.4 |
| 2004/0026552 A1 * | 2/2004 | Hiraguchi | 242/348.2 |

* cited by examiner

*Primary Examiner*—John Q. Nguyen
(74) *Attorney, Agent, or Firm*—Sughrue Mion, PLLC

(57) ABSTRACT

A recording tape cartridge has: a case rotatably accommodating a single reel with which one end portion of a recording tape is engaged and on which the recording tape is wound, the case having an opening which is formed at a corner portion of the case at a side of loading the case into a drive device, the opening being for pulling-out of a leader member attached to another end portion of the recording tape; and a projecting portion provided at an inner surface of the case in a vicinity of the opening. The projecting portion is provided substantially parallel to a direction of loading the case into the drive device.

6 Claims, 13 Drawing Sheets

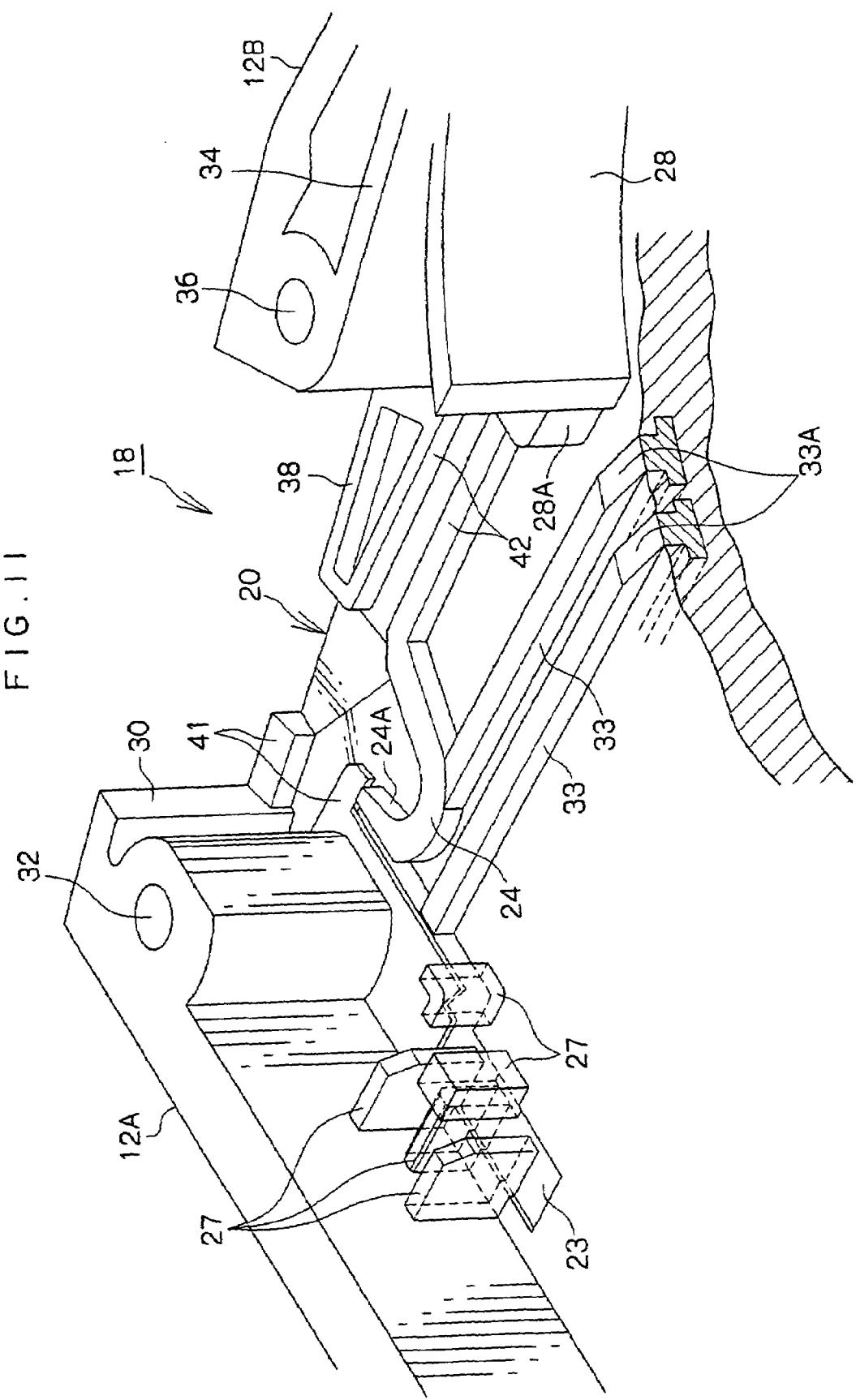

RECORDING TAPE CARTRIDGE

CROSS-REFERENCE TO RELATED APPLICATION

This application claims priority under 35 USC 119 from Japanese Patent Application No. 2002-255103, the disclosure of which is incorporated by reference herein.

BACKGROUND OF THE INVENTION

1. Field of the Invention

The present invention relates to a recording tape cartridge accommodating, within a case, a single reel on which is wound a recording tape, such as a magnetic tape or the like, which is used as a recording/playback medium mainly of computers or the like.

2. Description of the Related Art

Conventionally, magnetic tape cartridges have been known in which a magnetic tape, which is used as a data recording/playback medium of a computer or the like, is wound on a single reel, and the reel is accommodated in a case. A leader member, such as a leader pin, a leader tape, a leader block, or the like, is provided at the distal end of the magnetic tape. A pull-out mechanism provided at a drive device pulls the leader member but from an opening of the magnetic tape cartridge, and winds the magnetic tape, which is fixed to the leader member, onto a take-up reel of the drive device.

A reel gear is formed in an annular form in the center of the bottom surface of a reel which emerges from a hole formed in the bottom surface of the magnetic tape cartridge. Due to a driving gear, which is provided at a rotating shaft of the drive device, meshing with this reel gear, the reel is driven to rotate. By rotating the reel of the magnetic tape cartridge and the take-up reel of the drive device synchronously, data can be recorded onto the magnetic tape, and data recorded on the magnetic tape can be played back.

Such a magnetic tape cartridge requires little space for storage, and a large amount of information can be recorded thereon. The position of the opening and the type of the door which opens and closes the opening differ for each type of leader member. For example, in the case in which a leader pin is used, as shown in FIG. 13, an opening 68 for pulling out of a leader pin 60 is formed in a side wall 64 of a case 62. The opening 68 is opened and closed by a door 66 which slides in the direction of loading the magnetic tape cartridge into a drive device (the direction of arrow P) and the direction opposite thereto.

A reel 72, on which a magnetic tape T is wound, is rotatably accommodated within the case 62. The leader pin 60 is attached to a distal end of the magnetic tape T. A pair of upper and lower pin holding portions 70, which hold the leader pin 60 when the magnetic tape cartridge is not being used (is being stored or the like), are provided at the inner side of the opening 68 of the case 62. The pin holding portions 70 are concave portions which are substantially semicircular as seen in plan view, and respective one portions thereof are open so that the leader pin 60 can enter therein and exit therefrom. Both end portions 60A of the leader pin 60, which is in a state of standing upright, are inserted in these concave portions (the pin holding portions 70) (See U.S. Pat. No. 6,505,789 B2).

However, when the pin holding portions 70 are formed in concave shapes in this way, the plate thickness at these portions is thin (about 1.0 mm), and these portions are portions which are weak in terms of strength. Namely, when the case 62 is dropped and a vicinity of the opening 68 hits the ground or the like, there is the concern that, due to the impact, the pin holding portions 70 will flexurally deform and the leader pin 60 will fall out from the pin holding portions 70. If the leader pin 60 falls out from the pin holding portions 70, a problem arises in that the pull-out mechanism provided at the drive device cannot pull the leader pin 60 out.

SUMMARY OF THE INVENTION

An object of the present invention is to provide a recording tape cartridge having improved impact resistance in a vicinity of an opening such that, even if impact is applied to the vicinity of the opening due to a drop or the like, a leader pin does not fall out from pin holding portions.

A first aspect of the present invention provides a recording tape cartridge which comprises: a case rotatably accommodating a single reel with which one end portion of a recording tape is engaged and on which the recording tape is wound, the case having an opening which is formed at a corner portion of the case at a side of loading the case into a drive device, the opening being for pulling-out of a leader member attached to another end portion of the recording tape; and a projecting portion provided at an inner surface of the case in a vicinity of the opening.

Further, the projecting portion may extend in a direction substantially parallel to a direction of loading the case into the drive device.

In the above-described recording tape cartridge, the impact resistance with respect to an impact applied in a direction substantially parallel to the direction of loading the recording tape cartridge into a drive device, can be improved. Namely, when the recording tape cartridge (the case) is dropped from the edge portion of the opening, and in particular, the edge portion at the side of loading the recording tape cartridge into a drive device, damage is greatest, and the direction in which this impact force (maximum damage force) is directed is a direction substantially parallel to the direction of loading the recording tape cartridge into a drive device. Due to this impact force propagating, the case flexurally deforms in the same direction as the direction of propagation of the impact force. The leader member, which is held in a vicinity of the opening, falls out from the holding portion, or the position of the leader member with respect to the holding portion becomes offset.

Accordingly, the projecting portion, which has a predetermined length, is provided so as to extend in a direction substantially parallel to the direction of loading the recording tape cartridge into a drive device, and the impact resistance with respect to that direction and in a vicinity of the opening is improved. In this way, flexural deformation of the case at that portion can be suppressed. Accordingly, it is possible to prevent the leader member, which is held in a vicinity of the opening, from falling out from the holding portion, or the position of the leader member with respect to the holding portion from becoming offset, or the like.

Further, in the first aspect, a plurality of the projecting portions may be provided.

By providing a plurality of the projecting portions, it is possible to even further improve the impact resistance with respect to impacts applied in a direction substantially parallel to the direction of loading the recording tape cartridge into a drive device. Namely, the more projecting portions that are provided, the more the strength of the case at that portion can be increased. Thus, it is possible to even further suppress flexural deformation in a vicinity of the opening due to the impact of a drop.

A second aspect of the present invention provides a recording tape cartridge which comprises: a single reel with which one end portion of a recording tape is engaged and on which the recording tape is wound; a leader member attached to another end portion of the recording tape; a case rotatably accommodating the reel, and having an opening which is formed at a corner portion of the case at a side of loading the case into a drive device and which is for pulling-out of the leader member; a holding portion, provided at an inner surface of the case, for holding the leader member; play-restricting walls, provided so as to project out at portions on a circular locus at the inner surface of the case, having the reel rotatably mounted therein and restricting play of the reel; a screw boss disposed at the inner surface of the case in a vicinity of the opening, and a projecting portion provided at a region, which is further toward a front wall side than a straight line connecting the screw boss and a opening side front end portion of one of the play-restricting walls, and which is further toward the front wall side than the circular locus at which the play-restricting walls are disposed, the front wall being the wall of the case that faces the drive device when loading the recording tape cartridge therein.

A third aspect of the present invention provides a method of manufacturing a recording tape cartridge comprising the steps of: (a) engaging one end portion of a recording tape with a reel, and winding the recording tape on the reel; (b) attaching a leader member to another end portion of the recording tape; (c) forming an opening, for pulling-out of the leader member, at a corner portion of a case at a side of loading the case into a drive device; (d) forming a holding portion, for holding the leader member at an interior of the case, at an inner surface of the case in a vicinity of the opening; and (e) forming a projecting portion to extend at the inner surface of the case in the vicinity of the opening.

BRIEF DESCRIPTION OF THE DRAWINGS

FIG. 11 is a schematic perspective view showing the vicinity of the opening at which are provided projecting portions of another embodiment of the present invention.

DETAILED DESCRIPTION OF THE INVENTION

Hereinafter, a recording tape cartridge 10 relating to an embodiment of the present invention will be described on the basis of FIGS. 1 through 5. First, the overall structure of the recording tape cartridge 10 will be briefly described, and then, main portions relating to the present invention will be described in detail. Note that, for convenience of explanation, the direction of loading the recording tape cartridge 10 into a drive device is denoted by arrow A, and this direction of arrow A is the forward direction (front side) of the recording tape cartridge 10. The direction of arrow B, which is orthogonal to the direction of arrow A, is the rightward direction.

Figure 1:
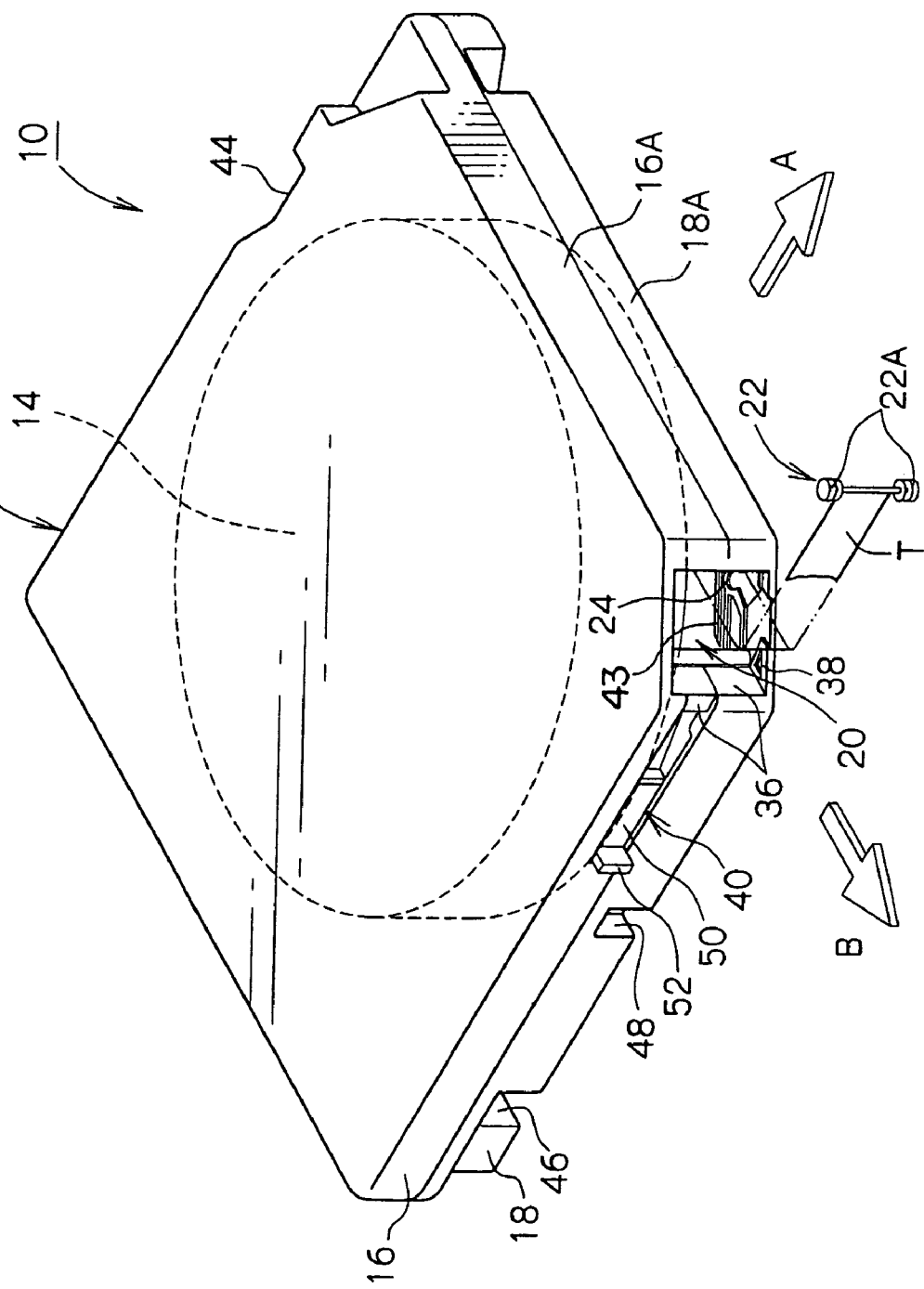
FIG. 1 is a schematic perspective view of a recording tape cartridge relating to an embodiment of the present invention.
Figure 2:
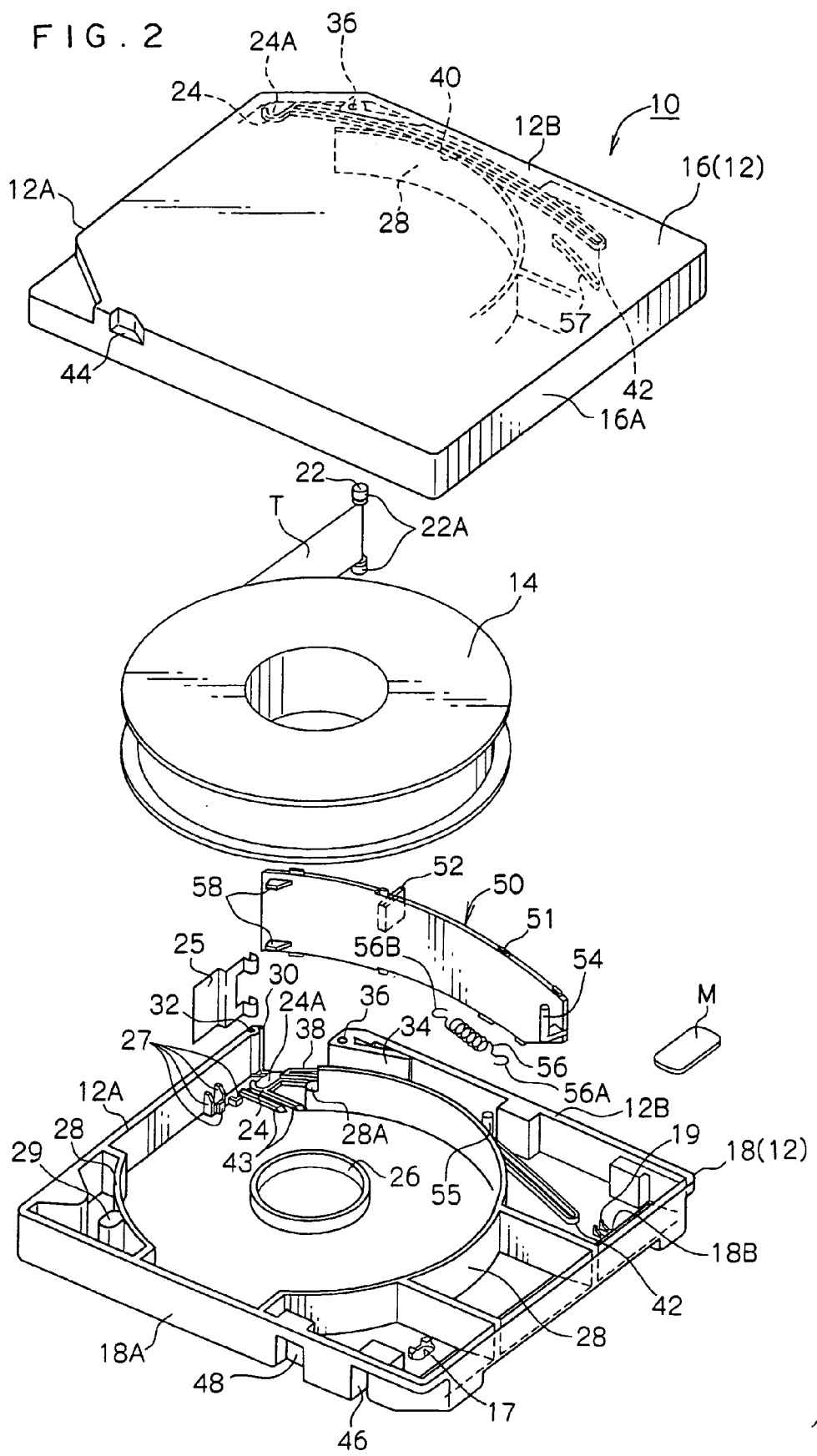
FIG. 2 is a schematic exploded perspective view of the recording tape cartridge of FIG. 1.

As shown in FIGS. 1 and 2, the recording tape cartridge 10 is structured such that a single reel 14, on which is wound a magnetic tape T serving as a recording tape which is an information recording/playback medium, is rotatably accommodated within a case 12 which is substantially rectangular as seen in plan view. The case 12 is formed by joining together an upper case 16 and a lower case 18 with peripheral walls 16A, 18A thereof opposing each other. The front right corner portion of each of the upper case 16 and the lower case 18, which is one corner portion at the leading side in the direction of loading the recording tape cartridge 10 into a drive device, is cut off at an incline as seen in plan view. A space for accommodating the reel 14, on which the magnetic tape T is wound, is provided at the interior of the case 12.

The corner portion of the upper case 16 and the lower case 18, at which corner portion the peripheral walls 16A, 18A have been cut off, forms an opening 20 which is for pulling-out of the magnetic tape T. A leader pin 22, which is pulled-out while being anchored (engaged) by a pull-out mechanism of a drive device, is connected to the free end of the magnetic tape T which is pulled out from the opening 20. An annular groove 22A is formed in each of the end portions of the leader pin 22 which project out further than the transverse direction end portions of the magnetic tape T. The annular grooves 22A are anchored by hooks or the like of the pull-out mechanism. In this way, the hooks or the like do not contact and scratch the magnetic tape T at the time of pulling-out the magnetic tape T.

Figure 3:
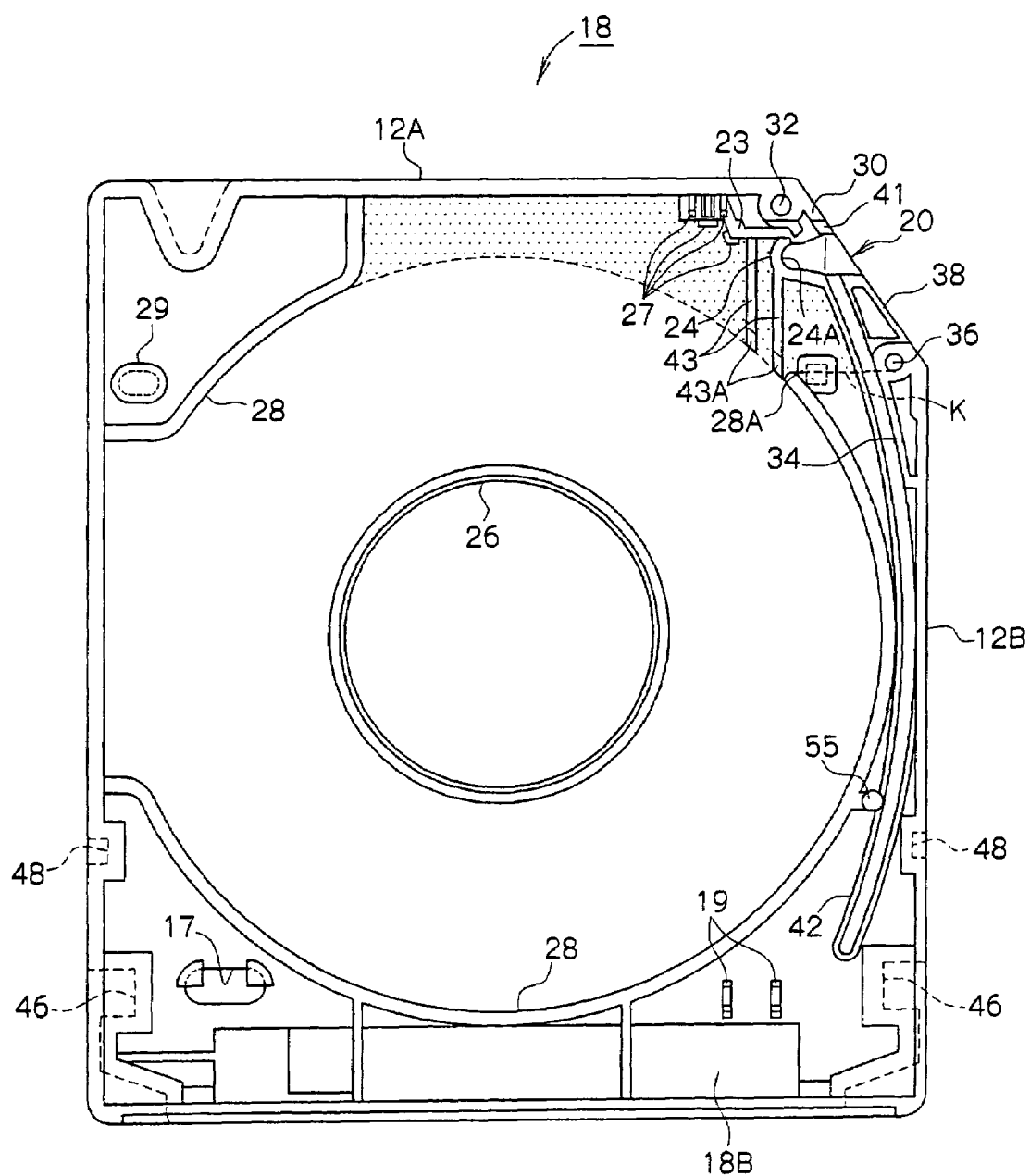
FIG. 3 is a schematic plan view of a lower case forming the recording tape cartridge of FIG. 1.
Figure 4:
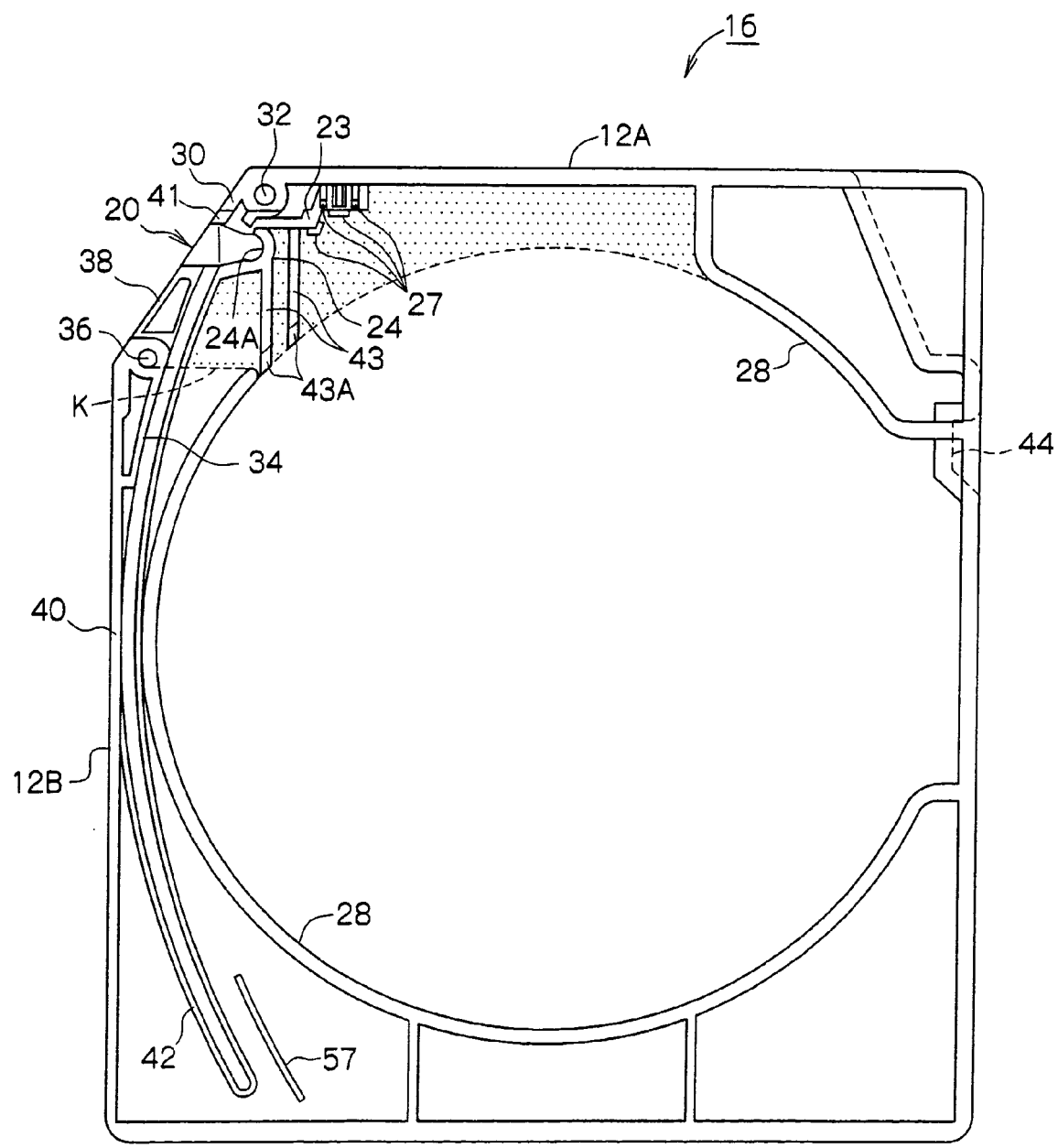
FIG. 4 is a schematic plan view of an upper case forming the recording tape cartridge of FIG. 1.

A pair of upper and lower pin holding portions 24, which position and hold the leader pin 22 within the case 12, are provided at the inner side of the opening 20 of the case 12, i.e., at the inner surface of the ceiling plate of the upper case 16 and at the inner surface of the floor plate of the lower case 18. As shown in FIGS. 3 and 4 as well, the pin holding portions 24 are substantially semicylindrical, and the magnetic tape T pull-out sides thereof are open. The both end portions of the leader pin 22, which is in a state of standing upright, are held so as to be able to enter in and exit from concave portions 24A of the pin holding portions 24 from these open sides.

A plate spring 25 is fixed in a vicinity of the pin holding portions 24 by the proximal portion of the plate spring 25 being inserted in spring holding portions 27 and groove portions 23 (see FIGS. 3 and 4) which are provided at the inner surface of a front wall 12A. (The front wall 12A is the portions of the peripheral walls 16A, 18A where the outer surfaces face in the direction of arrow A.) The distal end portions of the plate spring 25, which have been forked in two, engage with the upper and lower end portions of the leader pin 22 and hold the leader pin 22 in the pin holding portions 24. At the time when the leader pin 22 enters into and exits from the pin holding portions 24, the distal end portions of the plate spring 25 elastically deform appropriately so as to permit movement of the leader pin 22.

Further, a gear opening 26, which is for exposing an unillustrated reel gear of the reel 14 to the exterior, is formed in the central portion of the lower case 18. The reel 14 is driven to rotate within the case 12 by the reel gear meshing with a driving gear of a drive device. Further, the reel 14 is held so as to not joggle by play-restricting walls 28 which project out at portions of the inner surfaces of the upper case 16 and the lower case 18, and which serve as inner walls which are on a circular locus which is coaxial with the gear opening 26.

A hollow portion 28A, in which a hole for position regulation is formed, is provided so as to be continuous with the end portion of the play-restricting wall 28 in a vicinity of the opening 20. Further, a hollow portion 29, in which is formed a hole for position regulation which is a long hole, is provided so as to be set apart from the play-restricting wall 28 at the inner side of the front left corner portion of the case 12. The hollow portions 28A, 29 are disposed on a single straight line which runs along the direction of arrow B. The end portions of the play-restricting walls 28, except for the end portion thereof at which the hollow portion 28A is continuous, are continuous with the peripheral wall 16A or the peripheral wall 18A of the case 12, so as to partition the outer sides of the play-restricting walls 28 and the space at which the reel 14 is set.

A memory board M, which stores various types of information, is set at the rear right portion of the lower case 18 for each recording tape cartridge 10. A rear portion inner wall 18B is formed at an inclined surface of a predetermined angle such that sensing is possible at a drive device, which reads the information stored in the memory board M from the bottom surface side of the case 12, and at a library device (a device which accommodates a plurality of the recording tape cartridges 10 and which automatically loads and removes the recording tape cartridges 10 into and from drive devices), which reads the information stored in the memory board M from the rear wall side of the case 12. The memory board M is supported by supporting projections 19, and is disposed so as to be inclined at a predetermined angle.

An unillustrated write protect portion, which is set so that recording onto the recording tape cartridge 10 is possible or is not possible, is provided at the left rear portion of the lower case 18. An open hole 17, through which projects an operating projection (not illustrated) which operates the write protect portion, is formed in the left rear portion of the lower case 18.

A pair of top and bottom inclined wall portions 30, which are short and which prescribe the front edge portion of the opening 20, are provided at the right end portion of the front wall 12A of the case 12. The inclined wall portions 30 are bent along the plane of opening of the opening 20. The inclined wall portions 30 serve as dustproofing walls such that no gap through which dust or the like can enter arises, due to the distal end of a door 50, which is substantially arc-shaped in plan view and which will be described later, entering in at the inner side of the inclined wall portions 30 when the opening 20 is closed. Further, a pair of upper and lower screw bosses 32 are continuous with the inner side of the front wall 12A in vicinities of the left sides of the inclined wall portions 30.

A pair of upper and lower inclined wall portions 34, which are shaped, in plan view, so as to substantially follow along the outer peripheral surface of the door 50, are provided at the inner side of the front end portion of a right wall 12B of the case 12. (The right wall 12B is the portions of the peripheral walls 16A, 18A where the outer surfaces thereof face in the direction of arrow B.) The front end surfaces of the inclined wall portions 34 prescribe the rear edge of the opening 20. A pair of upper and lower screw bosses 36 are provided at the front end portions of the inclined wall portions 34.

A slit 40, which is of a predetermined length and serves as a window portion which communicates the interior and the exterior of the case 12, is formed in the right wall 12B of the case 12. The slit 40 is for exposing an operation projection 52 of the door 50 which will be described later. The slit 40 is formed by cutting-out the lower portion of the front side of the peripheral wall 16A of the upper case 16 which forms the right wall 12B, and the slit 40 opens toward the opening 20 as well. When the slit 40 is formed in this way such that a portion of the peripheral wall 16A remains at the upper side, the rigidity of the case 12 can be maintained. In particular, it is better that the upper side wall prescribing the slit 40 is integral and continuous with the inclined wall portion 34.

A concave portion 48 is formed at the rear side of the lower case 18. The portion of the concave portion 48, other than the upper end of the peripheral wall 18A, is recessed toward the inner side of the case 12 in a substantially U-shaped configuration as seen in cross-sectional view, and is recessed upwardly from the bottom surface of the case 12 as well (the floor plate is cut-out). The concave portion 48 is formed at the left wall of the case 12 as well. The concave portions 48 are engagement portions which, for example, a pull-in mechanism of a drive device engages. The floor surfaces (the downwardly-facing surfaces) of the concave portions 48 serve as reference surfaces for positioning within a drive device.

Concave portions 46 are formed at the rear sides of the concave portions 48. The portion of the concave portion 46, other than the upper end of the peripheral wall 18A, is recessed toward the inner side of the case 12 in a substantially U-shaped configuration as seen in cross-sectional view, and is recessed upwardly from the bottom surface of the case 12 as well (the floor plate is cut-out). The concave portions 46 are engagement portions which a grasping mechanism of a library device engages. By providing the concave portions 46, 48, the torsional strength of the case 12 (the lower case 18) is improved. Moreover, a concave portion 44, which is substantially trapezoidal as seen in plan view, is formed in the top surface portion of the left wall of the upper case 16. This concave portion 44 is an engagement portion which is engaged by a holding member (not shown) for canceling the rotational moment accompanying the movement of the door 50 in the direction of opening at the time of opening the opening 20.

Guide wall portions 42, which are predetermined heights (e.g., about 1.0 mm to 1.5 mm) and which support convex portions 51 of the door 50 (which will be described later) such that the convex portions 51 are nipped from both the inner surface side and the outer surface side, stand erect at the upper case 16 and the lower case 18 from a vicinity of the opening 20 to a vicinity of the region where the play-restricting walls 28 are closest to the right wall 12B (hereinafter, these portions will be called the front half guide wall portions 42), and from a vicinity of the rear end of the slit 40 to a vicinity of the rear wall (hereinafter, these portions will be called the rear half guide wall portions 42).

The guide wall portions 42 are formed in substantial arc-shapes as seen in plan view, and have different lengths at the upper case 16 and the lower case 18. The guide wall portion 42 at the upper case 16 is formed such that the rear half side thereof is longer than that of the guide wall portion 42 at the lower case 18. This is because the memory board M is disposed so as to be inclined at a predetermined angle at the right wall 12B side of the rear portion inner wall 18B of the lower case 18.

Further, the rear end portions of the guide wall portions 42 are closed in substantial arc-shapes as seen in plan view, and restrict the convex portions 51 which are furthest toward the rear at both the top and bottom of the door 50 such that the door 50 cannot move any further rearward. The front end portions of the guide wall portions 42 extend to positions which, when the leader pin 22 is entering and exiting, do not impede the entry or exit of the leader pin 22 (in the illustrated structure, positions which are about half of the opening width of the opening 20 and which are further rearward than the pin holding portions 24).

Guide wall portions 41, whose rear end portions are open, stand erect in vicinities of the inclined wall portions 30 so as to be positioned on imaginary lines extending from the guide wall portions 42. The rear end portions of the guide wall portions 41 do not extend further rearward than the front ends of the pin holding portions 24, so as to not impede the entry and exit of the leader pin 22. The interval (groove width) of the guide wall portion 41 is formed so as to be slightly narrower than the interval (groove width) of the guide wall portion 42.

Namely, the interval (groove width) of the guide wall portion 42 is formed to be slightly wider so as to permit dispersion in molding of the door 50 (dispersion in the curvature). The convex portions 51 of the door 50 therefore slide within the guide wall portions 42 in a state in which there is a certain amount of play. Accordingly, the interval (groove width) of at least the guide wall portion 41 is substantially the same size as the width of the convex portion 51 of the door 50 (the width including projections which will be described later). Due to the front most convex portions 51 being fit into the guide wall portions 41 when the opening 20 is closed, the door 50 can be held without joggling.

The guide wall portions 41 and the front half guide wall portions 42 are formed so as to be slightly lower than the rear half guide wall portions 42. Namely, for example, the heights of the guide wall portions 41 and the front half guide wall portions 42 are formed to be about 1 mm, whereas the heights of the rear half guide wall portions 42 are formed to be about 1.5 mm. This is in order to ensure, at the opening 20, space for entry of the pull-out mechanism of a drive device which engages and pulls-out the leader pin 22. Accordingly, as will be described later, the plate width (height) of the front half portion of the door 50 (at least the portion thereof which closes the opening 20) is formed to be larger (i.e., higher) by an amount corresponding to the amount by which the guide wall portions 41 and the front half guide wall portions 42 are made lower.

Further, ribs 38, which are substantially trapezoidal in plan view and which are integral with the guide wall portions 42 at the outer sides which are exposed from the opening 20, stand erect at the inner surface of the upper case 16 and the inner surface of the lower case 18 so as to be the same heights as these guide wall portions 42. The strength of the upper case 16 and the lower case 18 at the opening 20 portion is ensured by these ribs 38. The guide wall portions 42 at the inner side are integral and continuous with the pin holding portions 24. It is preferable that the heights of the pin holding portions 24 are formed to be substantially the same as or greater than the heights of the guide wall portions 42 with which they are integral and continuous.

The upper case 16 and the lower case 18 which were described above are fixed (joined) together by unillustrated screws being screwed, from beneath, into the screw bosses 32, 36 which are positioned in the vicinities of the edge portions of the opening 20. In this way, the corner portions at both ends of the opening 20, which are prescribed by the free ends of the inclined wall portions 30 of the front wall 12A and the inclined wall portions 34 of the right wall 12B and which are disadvantageous in terms of strength and which easily hit the ground or the like due to the case 12 being dropped, are joined together strongly. Even if the case 12 is dropped, the case 12 does not deform or buckle, and positional offset does not arise thereat, due to the entire weight of the recording tape cartridge 10. Note that the abutting surfaces of the peripheral walls 16A, 18A (the corner portions at both sides of the opening 20) may be fixed together by welding. Or, they may be fixed together by screws in consideration of the ability to disassemble and the ability to recycle the case 12.

The opening 20 is opened and closed by the door 50 which serves as a shielding member. The plate width (height) of the portion of the door 50 which slides in the guide wall portions 41 and the front half guide wall portions 42 (i.e., at least the portion of the door 50 which closes the opening 20) is formed to be substantially the same as the opening height of the opening 20. The portion at the rear side thereof is formed to be slightly smaller (lower). The plate length of the door 50 is formed to be sufficiently larger than the opening width of the opening 20. The door 50 is formed in a substantial arc-shape as seen in plan view which curves along the direction of plate thickness, such that the door 50 can move along a predetermined circumference. The curved longitudinal dimension of the door 50 is determined such that, in the state in which the door 50 closes the opening 20, the rear end portion of the door 50 is positioned in the right rear corner portion of the case 12, which is further toward the rear than the concave portion 48 (i.e., the right rear corner portion in a vicinity of the concave portion 46). The bottom rear portion of the door 50 is cut obliquely in order to avoid the memory board M which is disposed so as to be inclined at a predetermined angle at the rear portion inner wall 18B of the lower case 18. Note that the inner surface and/or the outer surface at the distal end portion (front end portion) of the door 50 is preferably formed as a tapered surface so as to smoothly enter into the guide wall portions 41.

The convex portions 51 project from the top surface and the bottom surface of the door 50. The convex portions 51 abut the guide surfaces of the guide wall portions 41 and the guide wall portions 42 (the inner surfaces which oppose each other) and the inner surface of the upper case 16 and the inner surface of the lower case 18 between the guide wall portions 41 and the guide wall portions 42, and guide the door 50 in the directions of opening and closing the opening 20. The convex portions 51 are formed in substantially oval shapes as seen in plan view which are long along the longitudinal direction of the door 50. Four convex portions 51 project at each of the top surface and the bottom surface of the door 50 so as to have top/bottom symmetry (except for the convex portions 51 furthest toward the rear), and so as to project to substantially the same heights as the heights of the guide wall portions 41 and the guide wall portions 42 (for example, about 0.5 mm at the front side of a border portion where the plate width of the door 50 changes, and about 1.5 mm at the rear side of this border portion). Note that the convex portions 51 furthest toward the rear do not have top/bottom symmetry because the bottom rear portion of the door 50 is cut obliquely.

The distal end of the convex portion 51 is formed in a substantial arc-shape as seen in sectional view (side view). Projections (not illustrated), which are substantially arc-shaped in plan view or are substantially triangular in plan view or the like, project along the entire height of the convex portion 51 at the both side surfaces of the convex portion 51. Accordingly, when the convex portions 51 are inserted between the guide wall portions 42 and slide, only the substantially arc-shaped distal ends of the convex portions 51 contact the inner surface of the upper case 16 and the inner surface of the lower case 18 such that linear contact arises thereat, and only the substantially arc-shaped (or the like) distal ends of the projections contact the mutually opposing guide surfaces of the guide wall portions 42 such that linear contact similarly arises thereat.

Thus, the sliding resistance (friction) between, on the one hand, the top and bottom convex portions 51, and, on the other hand, the inner surface of the upper case 16 and the inner surface of the lower case 18 between the guide wall portions 41 and the guide wall portions 42 and the guide surfaces of the guide wall portions 41 and the guide wall portions 42, can be reduced. Accordingly, the door 50 can be slid smoothly with little resistance. Note that, when the convex portions 51 are formed in substantially oval shapes as seen in plan view, the impact resistance thereof is better than if, for example, the convex portions 51 were to be formed in substantially circular shapes as seen in plan view. Thus, even if force is applied to the door 50 from a direction other than the opening/closing directions due to the impact of a drop or the like, there is no concern that the convex portions 51 will break.

An operation projection 52 serving as an operation portion projects along the radial direction of the door 50 from the outer peripheral surface of the door 50 at a region which is slightly further forward than the longitudinal direction central portion of the door 50 (i.e., at a vicinity of the border portion where the plate width of the door 50 changes). The operation projection 52 is exposed to the exterior of the case 12 from the slit 40. In the state in which the opening 20 is closed, the operation projection 52 is positioned so as to be slightly set apart from the rear end of the screw boss 36, and can be operated from the portion of the slit 40 which opens toward the front. Further, in the state in which the opening 20 is open, the operation projection 52 is positioned so as to be slightly set apart from the rear edge of the slit 40. At this time, the rear most convex portions 51 abut the rear end portions of the guide wall portions 42.

Although the interior and the exterior of the case 12 communicate via the slit 40 for exposing the operation projection 52, the slit 40 is always substantially closed by the screw boss 36 and by the door 50 which extends over substantially the entire height in the case 12. Further, adhesion of dust and the like to the magnetic tape T wound on the reel 14 is prevented by the play-restricting walls 28 serving as inner walls.

Further, stoppers 58, which abut the upper end portion side surface and the lower end portion side surface of the leader pin 22 when the opening 20 is closed, project at the inner surface of the front end portion of the door 50. The stoppers 58 can even further prevent the leader pin 22 from falling out from the pin holding portions 24 due to impact of a drop or the like. Further, a coil spring 56, which serves as an urging member which urges the door 50 in the direction of closing the opening 20, has a length such that it extends to the rear right corner portion of the case 12 in the state in which the door 50 closes the opening 20. Thus, the space between the play-restricting walls 28 and the right wall 12B (the peripheral walls 16A, 18A) at the rear right corner portion can be utilized effectively.

Namely, a spring holding portion 54, which is substantially L-shaped in rearview, projects integrally at the inner peripheral surface of the door 50 in the vicinity of the rear end thereof, so as to be directed upwardly. A solid cylindrical spring anchor portion 55 projects upwardly at the inner surface of the lower case 18 in a vicinity of the concave portion 48. Ring-shaped attachment portions 56A, 56B are formed at the both ends of the coil spring 56. Accordingly, the one attachment portion 56B of the coil spring 56 is placed on the spring anchor portion 55 from above such that the spring anchor portion 55 is inserted through the attachment portion 56B, and the other attachment portion 56A is placed on the spring holding portion 54 from above such that the spring holding portion 54 is inserted through the attachment portion 56A. The coil spring 56 can thereby be attached simply within the aforementioned space.

A rib 57, which the top end of the spring holding portion 54 slidingly contacts at the time when the door 50 is opening and closing, stands erect in a substantial arc-shape in plan view at the upper case 16. The rib 57 is disposed at a position and has a length such that the top end of the spring holding portion 54 can slidingly contact the rib 57 at least when the door 50 starts to move (open). Due to the rib 57 suitably guiding the spring holding portion 54 which moves against the urging force of the coil spring 56, the door 50 can be opened more stably (i.e., at the time of opening, the door 50 does not shake due to the urging force of the coil spring 56).

Further, by providing the rib 57, even if the attachment portion 56A of the coil spring 56 rises up along the spring holding portion 54 due to an impact caused by a drop or the like being applied to the case 12, the attachment portion 56A does not come off of the spring holding portion 54. Note that the top end of the spring anchor portion 55 is inserted between the play-restricting wall 28 and the guide wall portion 42 of the upper case 16. Thus, in the same way, the attachment portion 56B can be prevented from coming off of the spring anchor portion 55.

Figure 5:
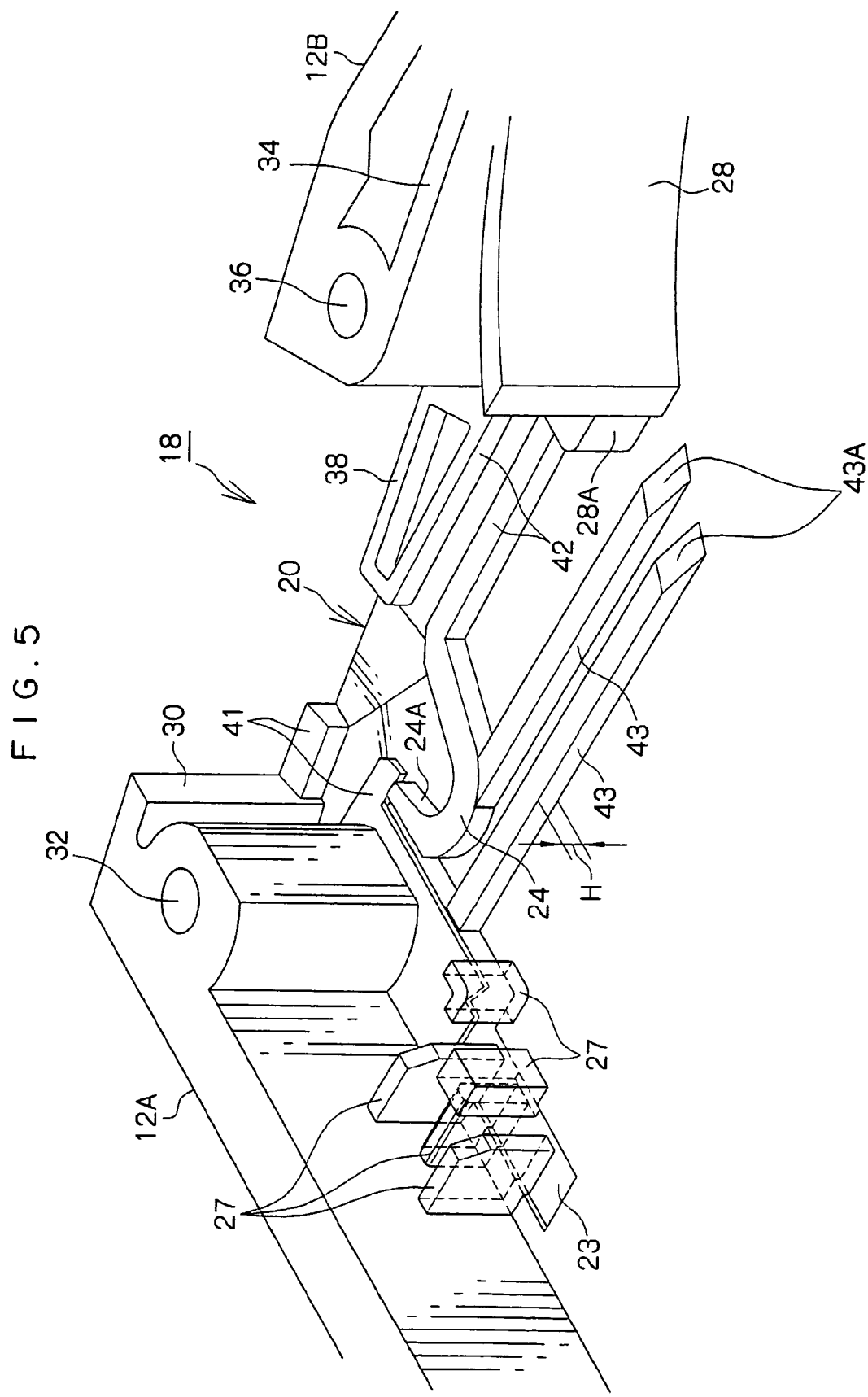
FIG. 5 is a schematic perspective view showing the state in a vicinity of an opening of the recording tape cartridge of FIG. 1.
Figure 6:
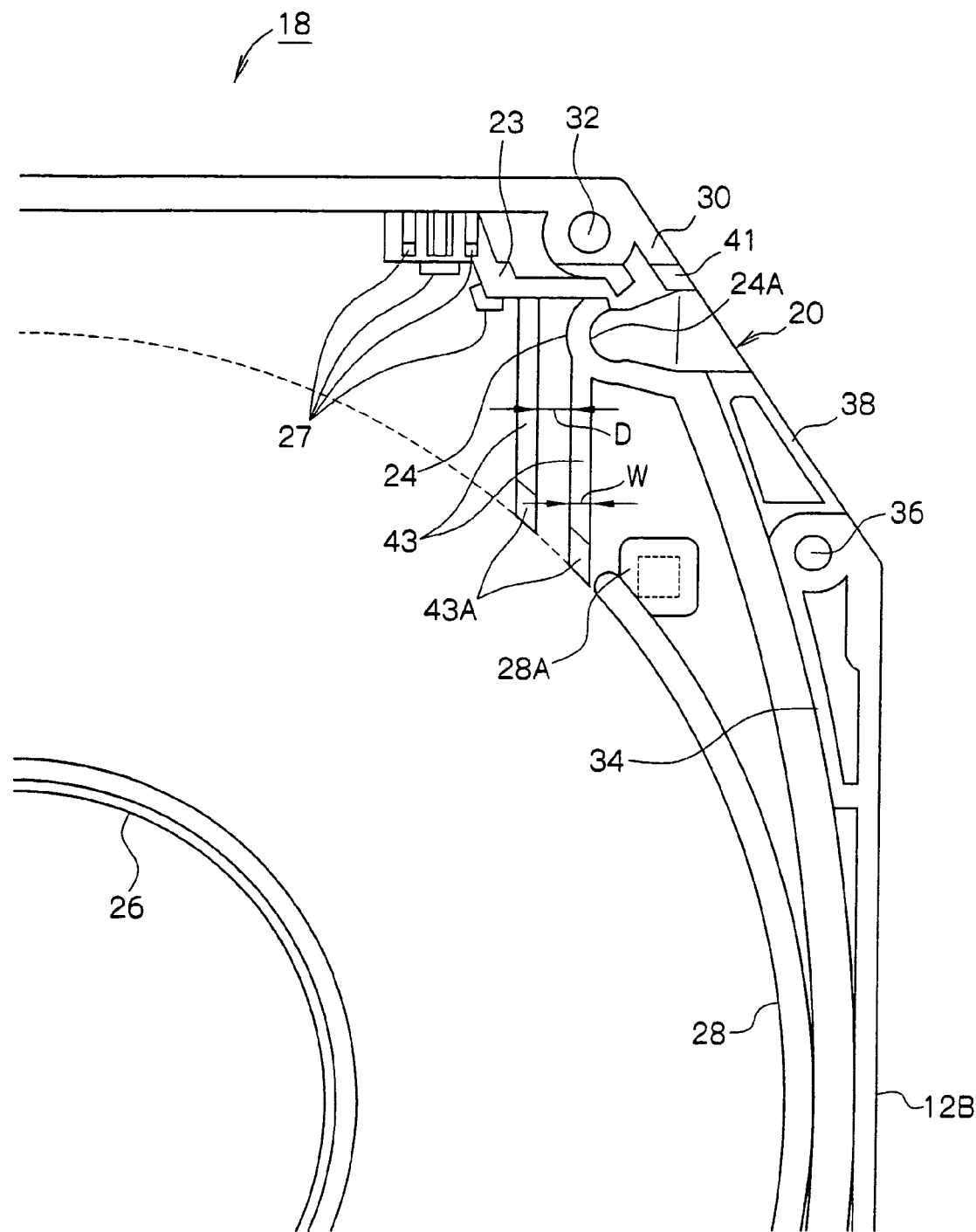
FIG. 6 is a partial enlarged schematic plan view of the vicinity of the opening shown in FIG. 5.

As shown in FIGS. 1 through 6, projecting portions 43, which are long and thin and are shaped as substantially rectangular columns, are formed to project at the inner surface of the case 12 at the opening 20 side of the recording tape cartridge 10 which is structured as described above, i.e., at the inner surface of the upper case 16 at the front wall 12A side and at the inner surface of the lower case 18 at the front wall 12A side. These projecting portions 43 may project anywhere provided that they are, in the plan views shown in FIGS. 3 and 4, further toward the front wall 12A side than an imaginary straight line K connecting the screw boss 36 and the opening 20 side front end portion of the play-restricting wall 28, and are further toward the front wall 12A side than a line, i.e., the circular locus at which the play-restricting walls 28 are provided (the curved line shown by the dashed line) which connects the play-restricting walls 28 at the left and right opposite sides of the opening 20 and which runs along the periphery of the region at which the reel 14 is disposed (i.e., provided that the projecting portions 43 are in the dotted region). However, it is preferable to provide a plurality of the projecting portions 43 substantially parallel to the direction of loading the recording tape cartridge 10 into a drive device, in the vicinity of the opening 20 and on the path along which the magnetic tape T passes. (In the illustrated structure, two projecting portions 43 are provided.) Namely, as shown in FIGS. 5 and 6 as well, one of the projecting portions 43 (the projecting portion 43 at the outer side) may extend integrally from the pin holding portion 24 substantially rearward along a predetermined length, i.e., until it substantially reaches an imaginary extension of the play-restricting wall 28 (the area of the reel 14 shown by the dashed line). Further, the other of the projecting portions 43 (the projecting portion 43 at the inner side) may extend substantially parallel thereto and separated therefrom by a predetermined distance D (D=1.0 mm to 2.0 mm, and preferably, D=1.5 mm), from the groove portion 23 between the pin holding portion 24 and the spring holding portion 27 over a predetermined length, i.e., until it substantially reaches an imaginary extension of the play-restricting wall 28 (the area of the reel 14 shown by the dashed line) (i.e., to a region at which it does not interfere with the reel 14).

Note that, when the rearmost end of the projecting portion 43 is cut at an incline such that a tapered surface 43A is formed thereat, there is even less interference with the reel 14. Moreover, a height H of the projecting portion 43 is formed to be, for example, H=0.9 mm, and at maximum is the same height as the pin holding portion 24, and is a height at which the projecting portion 43 does not interfere with the recording tape T which is being drawn out from the reel 14. Further, a width W of the projecting portion 43 is formed to be W=0.5 mm to 1.5 mm, and preferably W=1.0 mm.

By providing these projecting portions 43, it is possible to improve the impact resistance with respect to a drop from the edge portion of the opening 20, and in particular, from the front wall 12A side edge portion of the opening 20 where damage is great (where the leader pin 22 falls out from the pin holding portions 24 or the position of the leader pin 22 with respect to the pin holding portions 24 becomes offset). Namely, because the projecting portions 43 extend in a direction substantially parallel to the direction of loading the recording tape cartridge 10 into a drive device, the rigidity with respect to this direction can be ensured. Accordingly, if an impact is applied to the upper case 16 and the lower case 18 in a vicinity of the opening 20 in a direction substantially parallel to the direction of loading the recording tape cartridge 10 into a drive device (i.e., substantially in the front-back direction), vibrations and flexural deformation caused by this impact can be suppressed. Accordingly, it is possible to prevent the leader pin 22 from falling out from the pin holding portions 24 and the position of the leader pin 22 with respect to the pin holding portions 24 from becoming offset.

Figure 7:
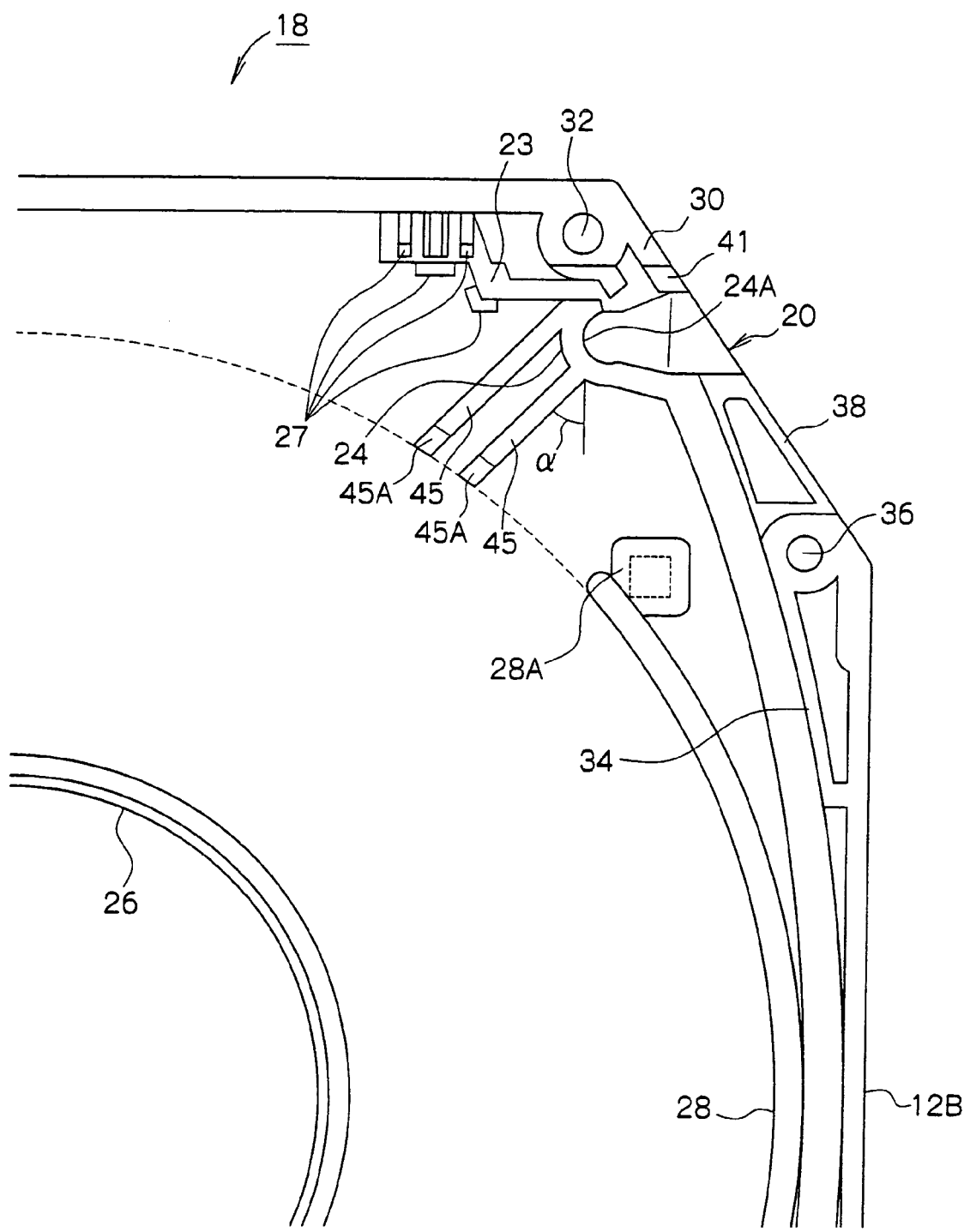
FIG. 7 is a partial enlarged schematic plan view showing the vicinity of the opening in another embodiment of the present invention.
Figure 8:
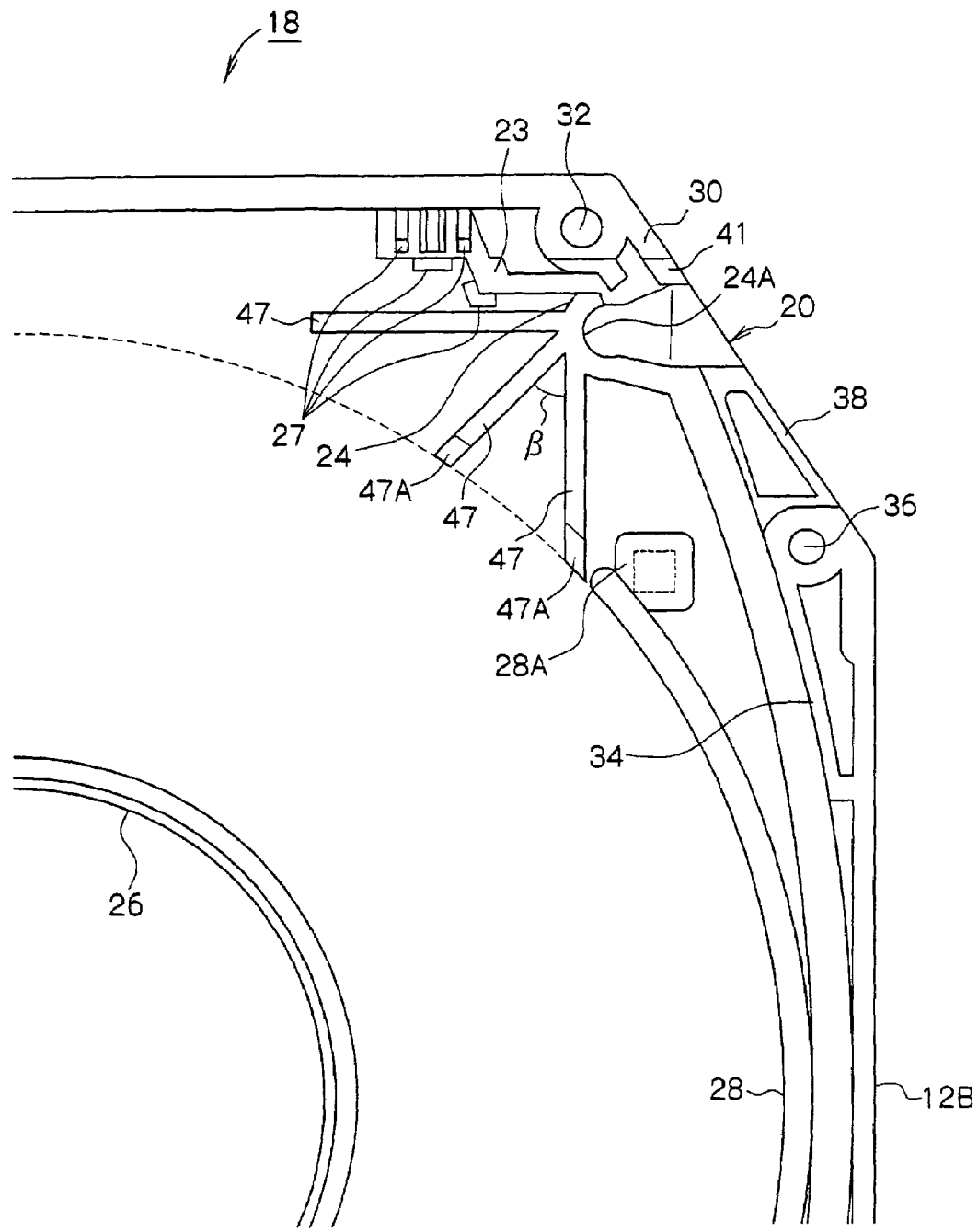
FIG. 8 is a partial enlarged schematic plan view showing the vicinity of the opening in yet another embodiment of the present invention.
Figure 9:
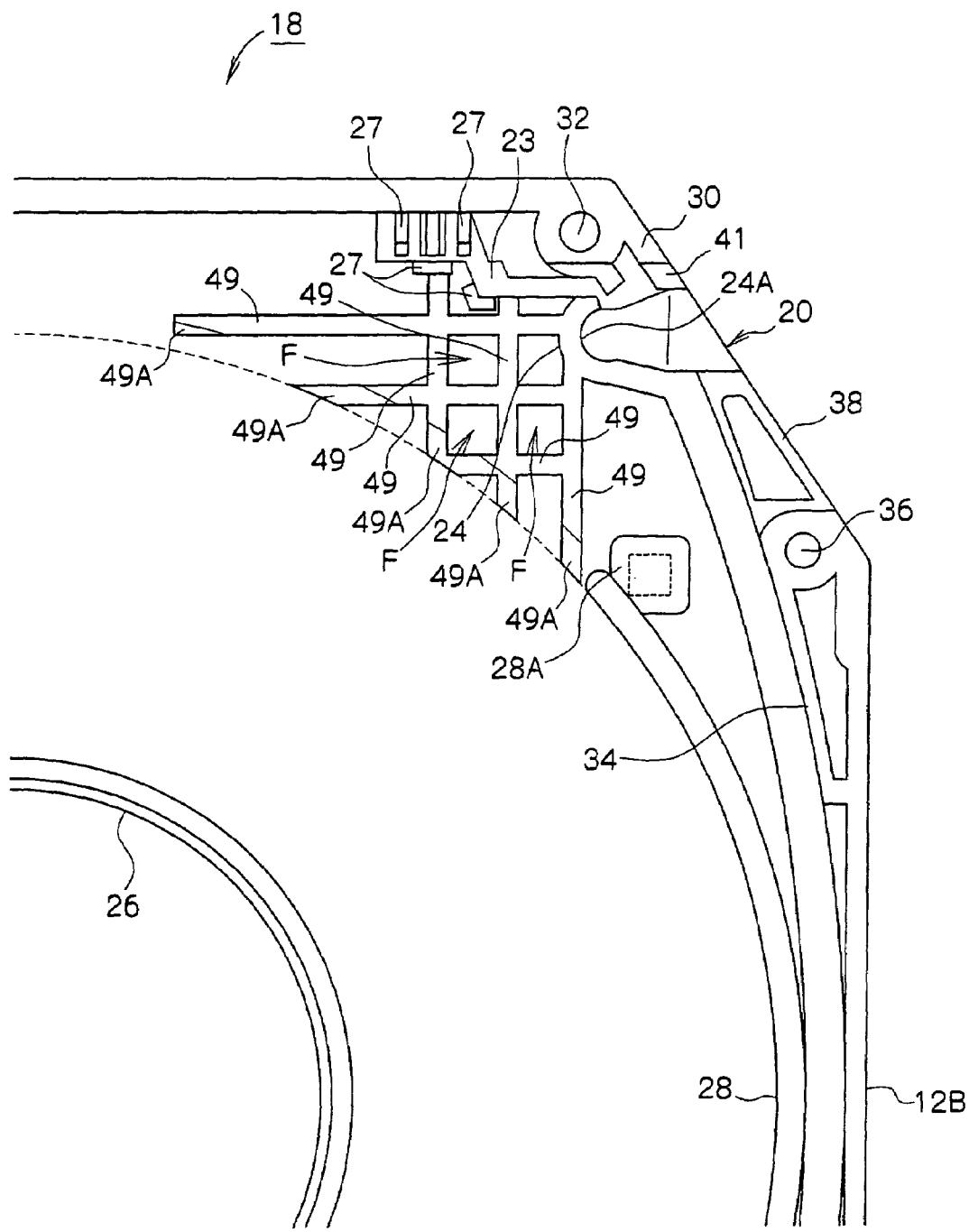
FIG. 9 is a partial enlarged schematic plan view showing the vicinity of the opening in still another embodiment of the present invention.

It goes without saying that the more projecting portions 43 that are provided, the more the strength of the case 12 can be increased. Moreover, although the projecting portion 43 such as that described above is the most preferable embodiment, the configuration of the projecting portion 43, the position at which the projecting portion 43 is disposed, the number of projecting portions 43, and the like are not limited to the structures shown in FIGS. 1 through 6. Namely, projecting portions 45, 47, 49 as shown in FIGS. 7 through 9 may be utilized. These projecting portions 45, 47, 49 are, in the same way as the above-described projecting portion 43, rectilinear, but are not formed only by structures which are provided substantially parallel to the direction of loading the recording tape cartridge 10 into a drive device.

Namely, in the same way as the projecting portions 43, two of the projecting portions 45 shown in FIG. 7 are provided parallel to one another. However, the projecting portions 45 are formed to project at an incline at a predetermined angle $\alpha$ with respect to the direction of loading the recording tape cartridge 10 into a drive device. The fact that the rearmost end of the projecting portion 45 is cut at an incline such that a tapered surface 45A is formed thereat is the same as with the projecting portion 43. Further, although not illustrated, the projecting portion 45 may be bent in a zigzag shape like the blade of a saw.

Further, three of the projecting portions 47 shown in FIG. 8 are formed to project radially from the pin holding portion 24. Namely, there is the projecting portion 47 provided parallel to the direction of loading the recording tape cartridge 10 into a drive device, the projecting portion 47 provided in a direction orthogonal thereto, and the projecting portion 47 provided therebetween so as to be inclined at a predetermined angle $\beta$ with respect to the direction of loading the recording tape cartridge 10 into a drive device. Note that, in the same way as with the projecting portions 43, the rearmost ends of at least the projecting portions 47 which are near to the reel 14 are cut at an incline such that tapered surfaces 47A are formed thereat.

The projecting portions 49 shown in FIG. 9 project in a lattice shape. Namely, the projecting portions 49 which are provided parallel to the direction of loading the recording tape cartridge 10 into a drive device, and the projecting portions 49 provided in the direction orthogonal thereto, are structured so as to intersect one another integrally. Note that, of the projecting portions 49 illustrated in FIG. 9, three are provided in the direction of loading the recording tape cartridge 10 into a drive device, and three are provided in the direction orthogonal thereto, such that a plurality of space portions F which are substantially quadrilateral in plan view are formed. However, the configuration of the space portions F is not limited to a configuration which is substantially quadrilateral as seen in plan view, and may be substantially triangular, circular, oval or the like in plan view. Namely, the lattice form of the projecting portions 49 may be formed such that the configuration of the space portions F is substantially triangular, circular, oval or the like in plan view. Moreover, in the same way as with the projecting portions 43, the rearmost ends of at least the projecting portions 49 which are near to the reel 14 are cut at an incline such that tapered surfaces 49A are formed thereat.

Figure 10:
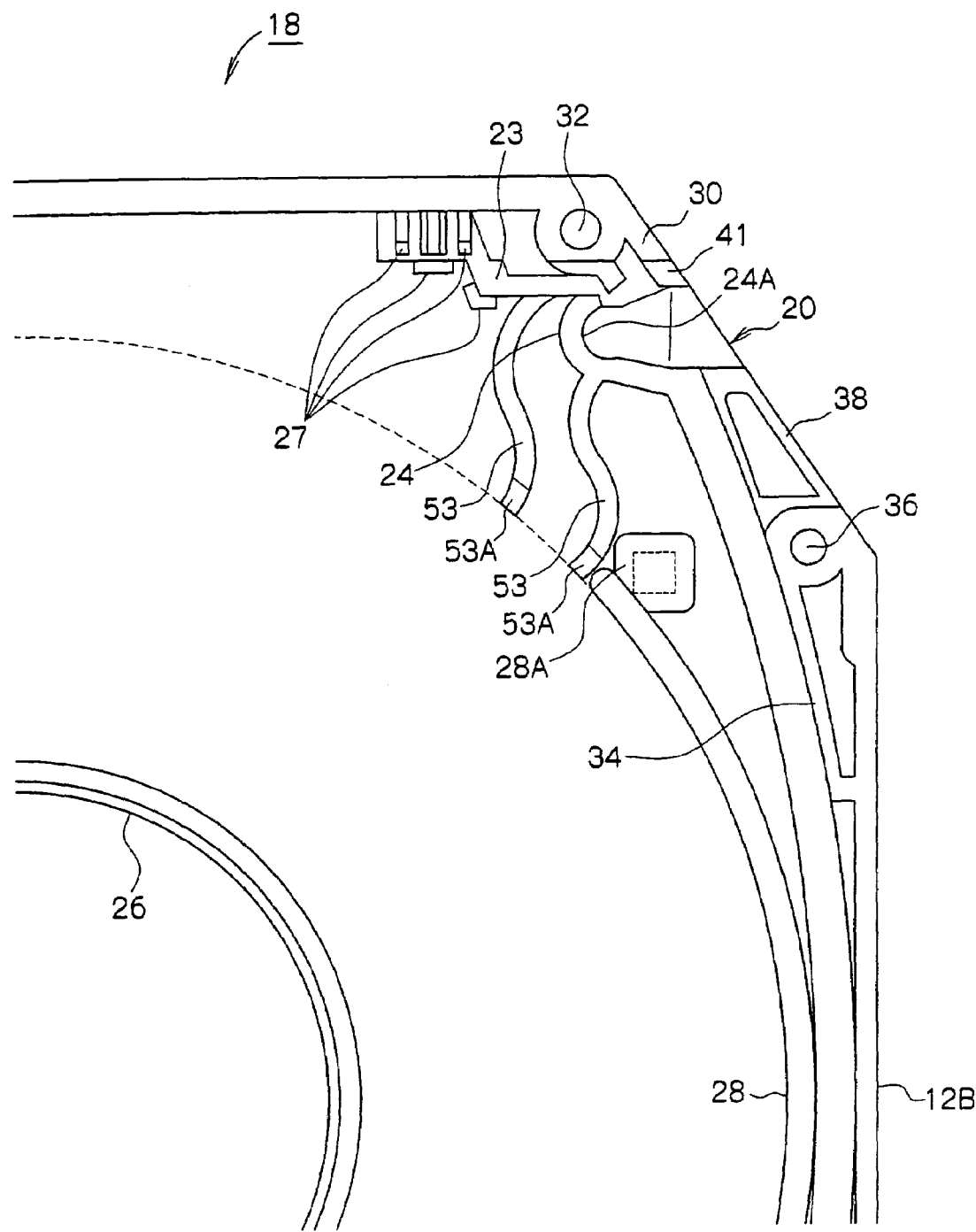
FIG. 10 is a partial enlarged schematic plan view showing the vicinity of the opening in still yet another embodiment of the present invention.

Moreover, as shown in FIG. 10, projecting portions 53 having curved configurations may be provided. In the same way as the projecting portions 43, two of the projecting portions 53 are provided. However, the projecting portions 53 are curved in arc-shapes so as to form substantially S-shaped configurations as seen in plan view. In the same way as with the projecting portions 43, the rearmost ends of the projecting portions 53 are cut at an incline such that tapered surfaces 53A are formed thereat. Further, it goes without saying that the curved configurations of the projecting portions 53 are not limited to the illustrated substantial S shapes in plan view, and arbitrary curved configurations may be employed. Moreover, a structure may be used in which the projecting portions 43, 45, 47, 49 and the projecting portion 53 are appropriately combined.

Here, the projecting portions 43, 45, 47, 49, 53 shown in FIGS. 1 through 10 are all molded of resin integrally with the upper case 16 or the lower case 18. However, as shown in FIG. 11, it is possible to provide projecting portions 33 which are separate members (e.g., formed of metal) integrally with the upper case 16 or the lower case 18 by insert molding or the like. The projecting portions 33 in this case preferably have configurations similar to those of the projecting portions 43, but are not limited to the configurations of the projecting portions 43 and may be provided in configurations similar to those of the projecting portions 45, 47, 49 shown in FIGS. 7 through 9 or the projecting portions 53 shown in FIG. 10 or the like. Note that, in the same way as with the projecting portions 43, the rearmost ends of the projecting portions 33 are cut at an incline such that tapered surfaces 33A are formed thereat.

Figure 12A:
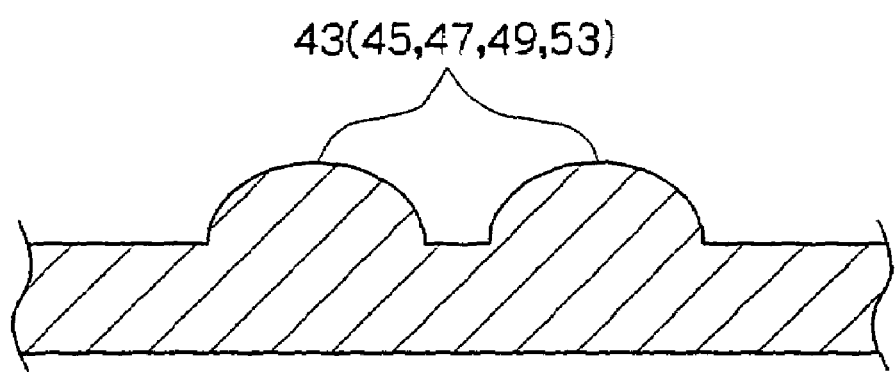
FIG. 12A is a schematic sectional view showing one configuration of the projecting portions relating to the embodiments of the present invention.

Further, the cross-sectional configurations of the projecting portions 43, 45, 47, 49, 53, 33 are not limited to quadrilateral configurations (square configurations). For example, as shown in FIG. 12A, the cross-sectional configurations may be oval configurations (curved surface configurations) or the like, or the projecting portions may be formed to have cross-sectional configurations which are combinations of such forms.

Furthermore, the position at which the pin holding portions 24 are set is a position which is near to one of the sets of screw bosses (the screw bosses 32 in the illustrated structure), and the plate thicknesses of the areas at which the pin holding portions 24 are set are formed to be relatively thick (e.g., 2 mm) at both the upper case 16 and the lower case 18. By setting the pin holding portions 24 at such a position and increasing the plate thickness at these areas in this way, it is possible to even further improve the strength in the vicinities of the pin holding portions 24 which are the positions at which the leader pin 22 is held (positioned) which are most important to the functioning of the recording tape cartridge 10 (in order for the pull-out mechanism of the drive device to correctly anchor the leader pin 22 when pulling-out the magnetic tape T). Accordingly, vibrations of the ceiling plate of the upper case 16 and vibrations of the floor plate of the lower case 18, which are caused by impact due to a drop or the like, can be suppressed, and it is possible to even further prevent the leader pin 22 from falling out from or the position thereof from becoming offset from the pin holding portions 24.

Figure 12B:
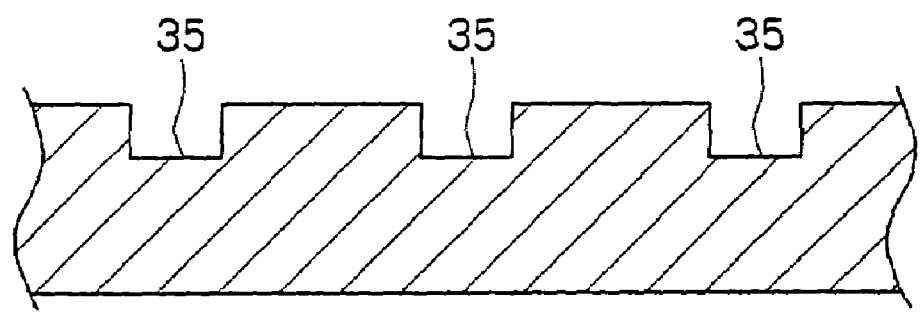
FIG. 12B is a schematic sectional view showing groove portions relating to the embodiments of the present invention.
Figure 13:
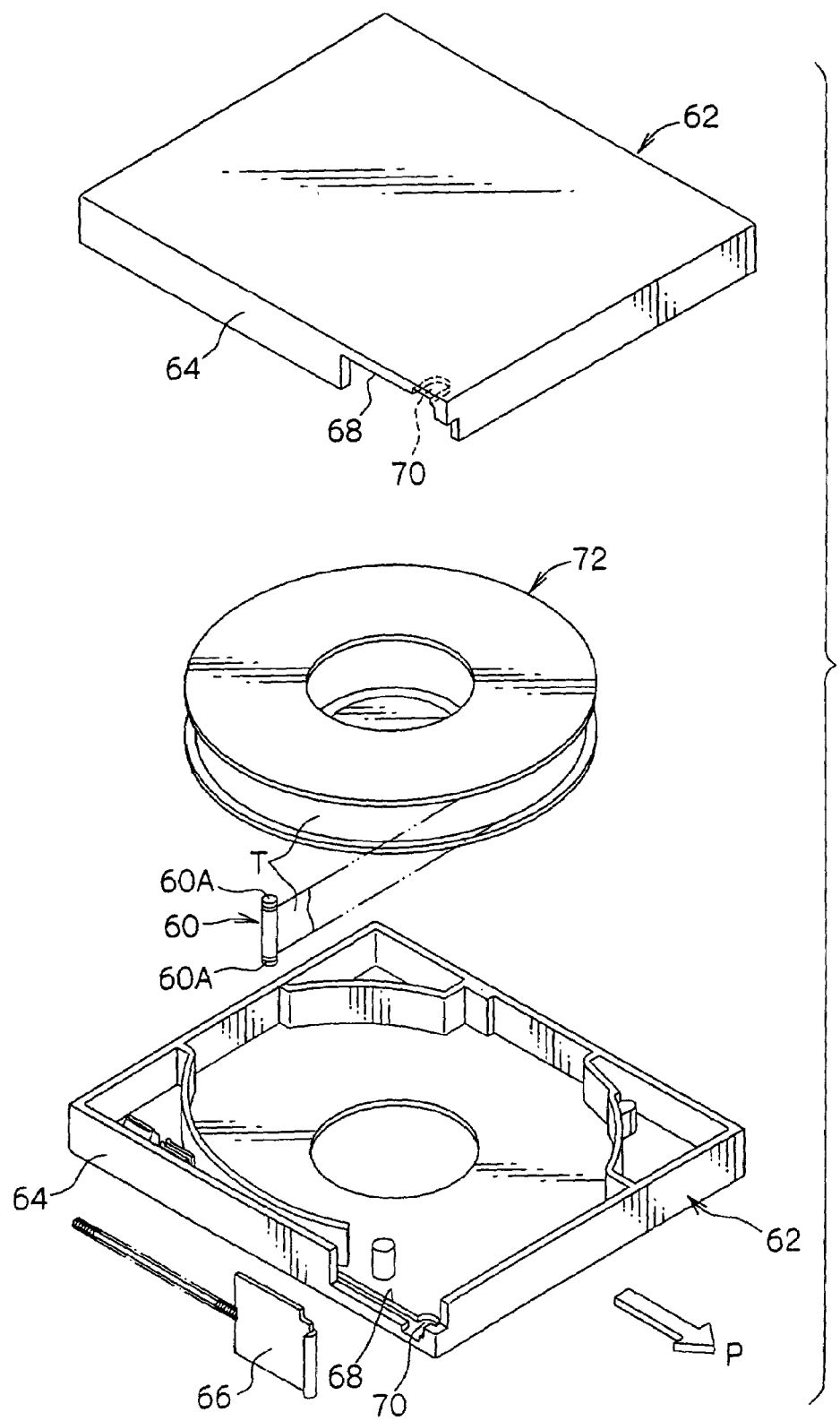
FIG. 13 is a schematic exploded perspective view of a conventional recording tape cartridge.

Moreover, when the plate thickness of the upper case 16 and the lower case 18 in a vicinity of the opening 20 is formed to be thick in this way, it is possible for the projecting portions 43, 45, 47, 49, 53 to not be provided as projections, and rather, as shown in FIG. 12B, to provide groove portions 35 such that configurations similar to those of the projecting portions 43, 45, 47, 49, 53 are formed at the inner surfaces of the upper case 16 and the lower case 18. However, providing the projecting portions 43, 45, 47, 49, 53 as projections is preferable in that there are fewer sink marks.

Next, operation of the present embodiment will be described by using, as an example, a case in which the projecting portions 43 are provided as projections. When the recording tape cartridge 10 having the above-described structure is not being used (i.e., is being stored, is being transported, or the like), the opening 20 is closed by the door 50. Specifically, due to the urging force of the coil spring 56, the door 50 is always urged in the direction of closing the opening 20, and closes the opening 20 in a state in which the distal end portion (front end portion) of the door 50 has entered in the guide wall portions 41 which are in a vicinity of the inclined wall portions 30.

On the other hand, when the magnetic tape T is to be used, the recording tape cartridge 10 is loaded into a drive device along the direction of arrow A. Accompanying this loading, an opening/closing member (not illustrated) forming an opening/closing mechanism of the drive device enters into the slit 40 which opens toward the front, and engages with the operation projection 52 of the door 50. In this state, when the recording tape cartridge 10 (the case 12) is pushed in further, due to the pushing-in force, the opening/closing member moves the operation projection 52 rearward against the urging force of the coil spring 56 (i.e., moves the operation projection 52 rearward relative to the case 12 which is loaded in the direction of arrow A).

Then, while the convex portions 51 are guided by the guide wall portions 42 and the spring holding portion 54 is guided by the rib 57, the door 50, from which the operation projection 52 projects, rotates clockwise as seen in plan view along the direction of curving thereof. Namely, due to the guide wall portions 42, the door 50 moves substantially rearward so as to circle around the outer sides of the pin holding portions 24 and the reel 14 without jutting out from the locus of movement along the curved configuration of the door 50, and opens the opening 20. Then, when the case 12 (the recording tape cartridge 10) is loaded to a predetermined depth in the drive device, the opening 20 is completely opened.

When the recording tape cartridge 10 is positioned within the drive device in this state in which the opening 20 is opened, further rotation (substantially rearward movement) of the door 50 is restricted. The pull-out mechanism of the drive device enters into the case 12 from the opening 20 which has been opened. The pull-out mechanism pulls-out the leader pin 22 which is positioned and held at the pin holding portions 24. Then, the leader pin 22 is accommodated at a take-up reel (not shown), and the take-up reel and the reel 14 are driven to rotate synchronously. Thus, the magnetic tape T is successively pulled-out from the case 12 while being taken-up onto the take-up reel. Information is recorded or played back by a recording/playback head or the like disposed along a predetermined tape path.

On the other hand, when the recording tape cartridge 10 is to be ejected from the drive device, the magnetic tape T is rewound onto the reel 14, and the leader pin 22 is held at the pin holding portions 24. The positioned state of the recording tape cartridge 10 is cancelled, and the recording tape cartridge 10 is moved in the direction opposite to the direction of arrow A by the urging force of the coil spring 56 or by an unillustrated ejecting mechanism. In this way, the door 50 is rotated in the direction of closing the opening 20 by the urging force of the coil spring 56, while the convex portions 51 are guided by the guide wall portions 42. Due to the distal end portion (front end portion) of the door 50 entering into the guide wall portions 41, the opening 20 is completely closed and returned to its initial state.

Here, a plurality (two in the illustrated structure) of the projecting portions 43 which have predetermined heights H (H=0.9 mm) are disposed at the inner surface of the upper case 16 and the inner surface of the lower case 18 in a vicinity of the opening 20, so as to extend over predetermined lengths substantially in the front-back direction (a direction substantially parallel to the direction of loading the recording tape cartridge 10 into a drive device). Thus, it is possible to improve the impact resistance with respect to a drop from the front wall 12A side edge portion of the opening 20 where damage is great (where it is easy for the leader pin 22 to fall out from the pin holding portions 24 or the position of the leader pin 22 with respect to the pin holding portions 24 to become offset). Accordingly, the leader pin 22 does not fall out from the pin holding portions 24, and the position of the leader pin 22 with respect to the pin holding portions 24 does not become offset.

In particular, when the case 12 is molded of a polycarbonate which does not contain glass fibers, the leader pin 22 coming out due to dropping (i.e., the leader pin 22 falling out from the pin holding portions 24 or the position of the leader pin 22 becoming offset) occurs, for example, at a height of 35 cm when the plate thickness in the vicinity of the opening 20 is 1.0 mm, and at a height of 75 cm when the plate thickness in the vicinity of the opening 20 is 1.7 mm, and at a height of 100 cm when the plate thickness in the vicinity of the opening 20 is 2.3 mm. However, by providing the projecting portions 43, the leader pin 22 does not come out at any of these heights. In this way, in cases in which the plate thickness of the case 12 in a vicinity of the opening 20 is formed to be thin, the projecting portions 43 are effectively utilized and can prevent the leader pin 22 from falling out of the pin holding portions 24 and the position of the leader pin 22 from becoming offset.

As described above, in accordance with the present invention, projecting portions, which extend in a direction substantially parallel to the direction of loading the recording tape cartridge into a drive device, are provided at the inner surface of the case in a vicinity of the opening. Thus, it is possible to improve the impact resistance with respect to that direction. Accordingly, flexural deformation of the case in that direction can be suppressed, and it is possible to prevent a leader member from falling out from holding portions and the position of the leader member with respect to the holding portions from becoming offset.

What is claimed is:

1. A recording tape cartridge having impact resistance, and comprising:
    a single reel with which one end portion of a recording tape is engaged and on which the recording tape is wound;
    a leader member attached to another end portion of the recording tape;
    a case rotatably accommodating the reel, and having an opening which is formed at a corner portion of the case at a side of loading the case into a drive device and which is for pulling-out of the leader member;
    a holding portion, provided at an inner surface of the case, for holding the leader member;
    play-restricting walls, provided so as to project out at portions on a circular locus at the inner surface of the case, having the reel rotatably mounted therein and restricting play of the reel;
    a screw boss disposed at the inner surface of the case in a vicinity of the opening, and
    a long and thin projecting portion disposed at the inner surface of the case in the vicinity of the opening and further toward a front wall side than a straight line connecting the screw boss and a opening side front end portion of one of the play-restricting walls, and further toward the front wall side than the circular locus at which the play-restricting walls are disposed, the front wall being the wall of the case that faces the drive device when loading the recording tape cartridge therein,
    wherein the opening is opened and closed by a door configured to slide in a substantially arc-shaped path, and
    wherein a height of the projecting portion is formed to be less than or equal to a height of the holding portion.

2. The recording tape cartridge of claim 1, wherein the projecting portion is provided at opposing positions at each of a ceiling plate and a floor plate of the case.

3. The recording tape cartridge according to claim 2, wherein the projecting portion is integrally formed with at least one of the ceiling plate and the floor plate.

4. The recording tape cartridge of claim 1, wherein the projecting portion is provided in a plurality at each of a ceiling plate and a floor plate of the case.

5. The recording tape cartridge of claim 4, wherein at least one of the plurality of projecting portions is provided integrally with the holding portion.

6. The recording tape cartridge according to claim 1, wherein the case comprises the front wall, a back wall, a first sidewall, and a second sidewall, the corner portion being disposed on an angled wall connecting the first sidewall and the front wall.

* * * * *